June 11, 1957 W. FITZPATRICK 2,795,424
SKIP-ROPE NOVELTY
Filed Sept. 29, 1955
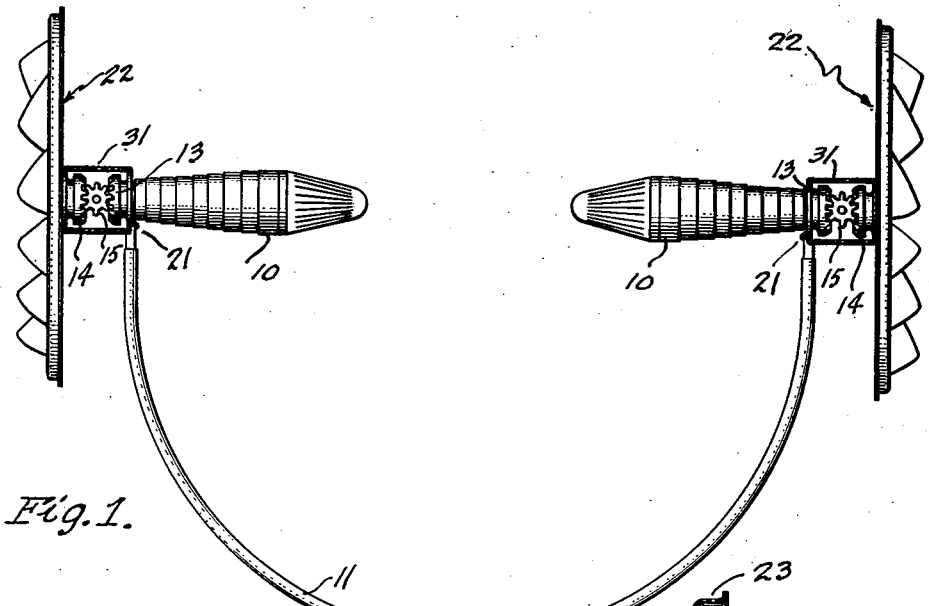
Fig. 1.
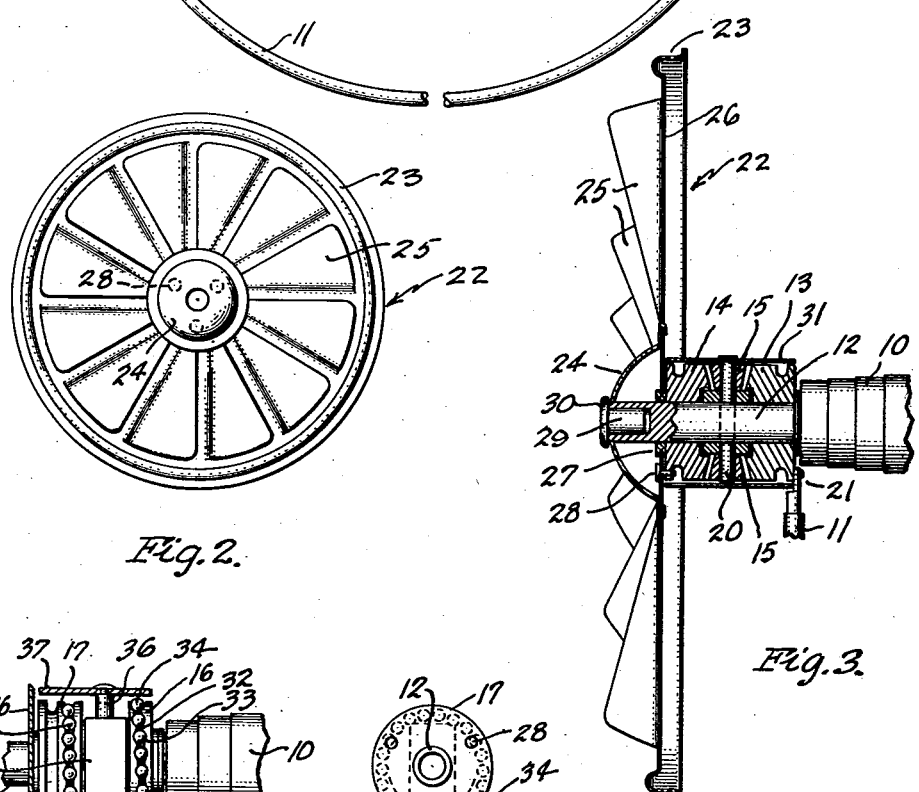
Fig. 2.
Fig. 3.
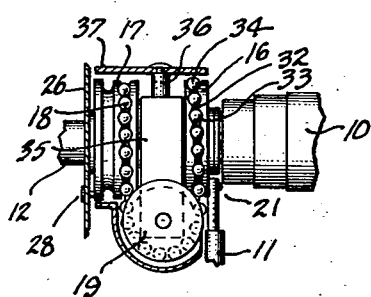
Fig. 4.
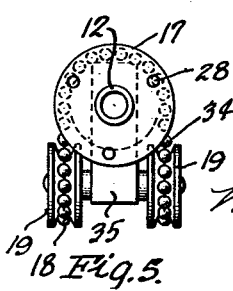
Fig. 5.
INVENTOR
William Fitzpatrick,
BY
Wooster Davis
ATTORNEYS.

United States Patent Office 2,795,424
Patented June 11, 1957

2,795,424

SKIP-ROPE NOVELTY

William Fitzpatrick, Bridgeport, Conn.

Application September 29, 1955, Serial No. 537,416

5 Claims. (Cl. 272—75)

This invention relates to a skip-rope novelty, and has for an object to provide a simple and effective handle gripping means at one or both ends of a skip-rope, which by the swinging action of the rope in the skipping operation will operate an attention-attracting means such, for example, as a rotatable ornament, or a sound-producing means, and similar devices.

It is another object to provide such a device which if used with a rotatable ornament will rotate this ornament in the opposite direction from the direction of rotation of the skipping-rope, for an improved effect.

A further object is to provide such a device which may be shipped in a box or container in a knock-down condition to reduce the space required, and in which a number of different forms of attention-attracting means, such, for example, as rotating ornaments, may be provided and applied as desired by the child using the device to secure different effects.

With the foregoing and other objects in view, I have devised the construction and arrangement illustrated in the accompanying drawing forming a part of this specification. It is, however, to be understood the invention is not limited to the specific details of construction and arrangement shown but may embody various changes and modifications within the scope of the invention.

In this drawing:

Fig. 1 shows a skipping-rope comprising this invention;

Fig. 2 is a front view indicating as an example an attention-attracting means such, for example, as a rotatable ornament;

Fig. 3 is a vertical section on a larger scale of one form of hand grip and the driving connection between one end of the flexible skip-rope and the attention-attracting means;

Fig. 4 is a partial section and partial side elevation showing a modified driving means for the attention-attracting means, and Fig. 5 is an end view of the driving means of Fig. 4.

The device shown comprises a pair of grip handles 10 connected by a flexible jumping-rope 11. Projecting from one end of the handle 10 is a shaft 12 on which is mounted to rotate a pair of gear elements, which in the form of Figs. 1 and 3 comprises a pair of toothed gears 13 and 14 connected by a pair of intermediate idler gears or pinions 15, while in the modified form of Figs. 4 and 5 the gear elements are in the form of chain sprockets 16 and 17 connected by a suitable type of chain such as a ball chain 18 running over intermediate grooved idler or guide pulleys 19. The intermediate pinions 15 may be mounted by any suitable means, but as shown in Fig. 3 they are mounted on a transverse pin 20 passing through the shaft 12. One end of the flexible skip-rope 11 is connected to one of the gear elements, preferably the inner element 13, by any suitable means, such, for example, as a rivet connection 21, and connected to the other gear element 14 is an attention-attracting means to be operated by this gear element. This may be a rotatable ornament, such, for example, as that indicated at 22, or it could operate a sound-producing means, such, for example, as a whistle, horn or the like.

In the form shown this ornament is in the form of a disc comprising an outer beaded flange or rim 23, and between this and the hub 24 it is provided with a series of radially extending ornamental vanes 25 which may be cut from a flat disc 26 along one edge and then bent laterally out of the plane of the disc about its opposite edge. These vanes could be painted different colors or have different colored decorations to give various effects as the disc is rotated. It is preferably detachably connected to the gear element 14 so that a plurality of different ornaments could be sold with a set of handles, and the child using it could apply different ornaments to the handles for different effects. In the arrangement shown a bearing bushing 27 is provided in an opening in the disc 26 and the hub 24 is given a dished form to provide another bearing spaced from the bearing 27 to hold the ornament against tipping on the shaft 12, and it is connected to the gear element 14 or 19 to be driven thereby by any suitable means, such for example as a series of detachable pins or studs 28. It is retained on the shaft by any suitable connecting means, a very satisfactory and effective one being a slightly tapered square or round pin 29 having a tight fit in a similarly shaped opening in the end of the shaft, and provided with a flange 30 so that when forced into the opening in the shaft this flange overlapping the hub 24 will retain the ornament in position. The driving mechanism comprising the gear elements may be enclosed within a suitable covering or casing 31 mounted on the outer ends of the pin 20.

In the modified driving arrangement of Figs. 4 and 5 the gear elements 16 and 17, as previously indicated, are in the form of chain sprockets each having a peripheral groove 32 to receive the ball chain 18, and having enlarged sockets or recesses 33 to receive the balls 34 of the chain. The end of the flexible skipping-rope 11 is connected by the connection 21 to the gear element 16, while the ornament 22 including the disc 26 is connected to the other gear element 17 by the same arrangement as shown in Fig. 3. These gear elements 16 and 17 are mounted to rotate on the shaft 12 the same as in the first form, while the grooved idler or guide rollers 19 are mounted on an intermediate support 35 secured to the shaft 12 between the gear elements 16 and 17 by any suitable means, such as a pin 36. This gear drive may be enclosed in a suitable protective cover or casing 37 mounted on this projecting pin 36.

It will be understood from the above that a swinging or rotating action of the rope 11 in the skipping or jumping operation will rotate the gear element, either 13 or 16, to which the end of the rope is connected, and rotation of this gear element will through the intermediate drive connection, either 15 or 18, operate the other gear element, either 14 or 17, in the opposite direction. Therefore the ornament or other attention-attracting means connected to the driven gear element 14 or 17 will be operated in the opposite direction from the direction of rotation of the flexible skip-rope, giving quite a different effect if an ornament is used than if it rotated in the same direction. The grip handles as shown in Fig. 1 are shown in the position in which they would be held by a child swinging its own skip rope, so that the ornaments 22 are on the outside, but if the rope is held and operated by others than those doing the skipping or jumping, they would be reversed so that the grip handles are on the outside and the ornaments on the inside.

It will be understood from the above that this provides a very effective skip-rope novelty which is of simple construction, but may be used to provide very effective attention-attracting means operated by the movement of the rope in the skipping operation, making it much more attractive and interesting to the children using the device.

Having thus set forth the nature of my invention, I claim:

1. A skip-rope comprising a grip handle, a shaft projecting from one end of the handle, a pair of gear elements mounted to rotate on the shaft, an intermediate driving connection between the gear elements through which rotation of one gear element drives the other in the opposite direction, a flexible skip-rope adapted to form a skipping loop operable by said handle, means connecting one end of the flexible rope to one gear element laterally from its axis to rotate it by swinging of this rope in the skipping operation, and a rotating attention-attracting means operated by the second gear element.

2. A skip-rope comprising a grip handle, a pair of rotatable gear elements mounted at one end of the handle, a driving connection between the gear elements through which rotation of one gear element drives the other in the opposite direction, a flexible skip-rope adapted to form a skipping loop operable by said handle means connecting one end of the flexible rope to one gear element laterally from its axis to rotate it by swinging action of this rope in the skipping operation, and a rotatable ornament connected to the second gear element to be rotated thereby.

3. A skip-rope comprising a grip handle provided with a shaft projecting from one end, a pair of gear elements mounted to rotate on the shaft including an inner gear element adjacent the end of the handle, an intermediate driving connection between the gear elements whereby rotation of the inner element will drive the other element, a flexible skip-rope adapted to form a skipping loop operable by said handle, means connecting one end of the flexible rope to the inner gear element laterally of its center axis to rotate this element by swinging movements of this rope during the skipping operation, and a decorative member mounted on the other gear element to rotate therewith.

4. A skip-rope comprising a grip handle provided with a shaft projecting from one end, a pair of rotatable toothed gear elements mounted on the shaft, an idler toothed gear between and connecting the first elements whereby rotation of one of the first elements will drive the other of these elements, a flexible skip-rope adapted to form a skipping loop operable by said handle, means connecting one end of the flexible rope to one of the gear elements laterally of its axis to rotate this element by swinging movements of this rope during the skipping operation, and an attention-attracting means connected to and operated by the second gear element.

5. A skip-rope comprising a grip handle provided with a shaft projecting from one end, a pair of rotatable gear elements mounted on the shaft each comprising a ball chain sprocket having a peripheral groove provided with recesses to receive the balls of a ball chain, a pair of guide rolls between the gear elements, a driving connection between the gear elements comprising a ball chain connecting the gear elements located in the grooves and passing around the guide rolls, a flexible skipping rope adapted to form a skipping loop operable by said handle, means connecting one end of the flexible rope to one of the gear elements at a point spaced laterally from the shaft to rotate this element by swinging action of this rope during the skipping operation, and an attention-attracting means connected to and operated by the other gear element.

References Cited in the file of this patent
UNITED STATES PATENTS

| | | |
|---|---|---|
| 1,397,425 | Jex | Nov. 15, 1921 |
| 1,787,349 | Arnold | Dec. 30, 1930 |